US012580143B2

(12) United States Patent
Marker et al.

(10) Patent No.: US 12,580,143 B2
(45) Date of Patent: Mar. 17, 2026

(54) PYROTECHNIC CIRCUIT INTERRUPTER

(71) Applicant: ASTOTEC AUTOMOTIVE GMBH, Hirtenberg (AT)

(72) Inventors: Ludwig Marker, Grillenberg (AT); Dietmar Haba, Baden (AT)

(73) Assignee: ASTOTEC AUTOMOTIVE GMBH, Hirtenberg (AT)

( * ) Notice: Subject to any disclaimer, the term of this patent is extended or adjusted under 35 U.S.C. 154(b) by 254 days.

(21) Appl. No.: 18/288,196

(22) PCT Filed: Mar. 24, 2022

(86) PCT No.: PCT/AT2022/060091

§ 371 (c)(1),
(2) Date: Oct. 30, 2023

(87) PCT Pub. No.: WO2022/226557

PCT Pub. Date: Nov. 3, 2022

(65) Prior Publication Data

US 2024/0222053 A1 Jul. 4, 2024

(30) Foreign Application Priority Data

Apr. 29, 2021 (AT) .............................. A 50330/2021

(51) Int. Cl.
*H01H 39/00* (2006.01)
*H01H 9/30* (2006.01)

(52) U.S. Cl.
CPC ............. *H01H 39/006* (2013.01); *H01H 9/30* (2013.01)

(58) Field of Classification Search
CPC .. H01H 39/006; H01H 9/30; H01H 2039/008; H01H 39/00

(Continued)

(56) References Cited

U.S. PATENT DOCUMENTS 7,182,012 B2 2/2007 Brede
9,953,783 B2 4/2018 Fellmer (Continued)

*Primary Examiner* — Lheiren A Caroc
(74) *Attorney, Agent, or Firm* — Andrew Wilford

(57) ABSTRACT

The invention relates to a pyrotechnic current breaker (1) for severing a conductor (9), having a housing (2) which is equipped with a cutting piston (8) and an ignition unit (16) for driving the cutting piston (8). The conductor (9) passes through the housing (2), and when the igniter (18) is triggered, the cutting piston (8) severs a printed circuit board (12) from the conductor (9). According to the invention, at least one spacer (20), preferably three spacers (20), are provided between the cutting piston (8) and the conductor (9), said spacers having the shape of pins and lying on a circle (19), the center of which lies on the central axis (24) of the cutting piston (8). If the side of the spacers facing the printed circuit board (12) is angled such that the region (21) of each spacer (20) adjoining the central axis (24) has a shorter distance to the printed circuit board (12) than the region (23) facing away from the central axis (24), the spacers (20) are pushed towards the central axis (24) when the igniter is triggered such that the spacers can be received in a recess (22). Furthermore, the region (21) adjoining the central axis (24) is easily deformable such that changes in the distance between the cutting piston (8) and the conductor (9) due to temperature fluctuations are compensated for.

17 Claims, 2 Drawing Sheets

(58) Field of Classification Search
USPC ........................................................ 200/61.08
See application file for complete search history.

(56) References Cited

U.S. PATENT DOCUMENTS

| | | | |
|---|---|---|---|
| 10,418,212 B2 | 9/2019 | Warenits | |
| 12,191,097 B2 * | 1/2025 | Sun | H01H 71/10 |
| 12,261,003 B2 * | 3/2025 | Shi | H01H 39/006 |
| 2021/0350991 A1 | 11/2021 | Fukuda | |

* cited by examiner

PYROTECHNIC CIRCUIT INTERRUPTER

CROSS REFERENCE TO RELATED APPLICATIONS

This application is the US-national stage of PCT application PCT/AT2022/060091 filed 24 Mar. 2022 and claiming the priority of Austrian patent application A50330/2021 itself filed 29 Apr. 2021.

TECHNICAL FIELD

The present invention relates to a pyrotechnic circuit interrupter for severing a conductor where the circuit interrupter has a housing holding a shear piston and an explosive charge for driving the shear piston and where the conductor passes through the housing.

PRIOR ART

Pyrotechnic circuit interrupters for reliable emergency shutdown and suppression of harmful overcurrents have experienced a large growth with the increase in electromobility. A typical circuit interrupter is described, for example, in AT 517872 [U.S. Pat. No. 10,418,212] whose FIG. 1 is a schematic view of a first embodiment. The principle of severing a conductor by a shear piston is in various embodiments, with one or two separating points, with or without extinguishing agent. Although in many cases the different behavior is a problem at different temperatures, in particular at high temperatures only a degraded electrical isolating power is achieved. This is particularly disadvantageous because the vehicle batteries generally have lower short-circuit currents at lower temperatures, i.e. requirements for the separation process are generally lower than at room temperature or high temperatures, and the electrical systems are usually exposed to higher temperatures during operation by self-heating.

SUMMARY OF THE INVENTION

It is an object of the present invention to provide a pyrotechnic circuit interrupter in which the separation power is less dependent on the temperature than in the known circuit interrupters.

This object is attained according to the invention by a pyrotechnic circuit interrupter of the above-described type in that at least one spacer, preferably three spacers, is provided between the shear piston and the conductor.

Even if the inventors are not sure why the spacers reduce the temperature dependence, they have the following assumption: Without a spacer, the shear piston immediately begins its downward movement as soon as the explosive charge also produces only a small amount of gas, that is to say has built up only a low overpressure. As a result, further pressurization is very rapid, but this higher positive pressure no longer acts over the entire path of the shear piston, because it has already moved some distance. The acceleration is therefore too low at the start of movement. In contrast, the shear piston is initially held in position by spacers until the overpressure has become so great that the spacers are broken or pushed to the side, so that from the beginning of the movement a higher overpressure acts on the shear piston and it has a higher speed when it strikes the conductor, such that higher forces act on the conductor as a result of the inertia of the shear piston.

It is advantageous if the at least one spacer has the shape of a pin or pins. The failure of the pins is caused by fracture or deformation, which is easily reproducible, so that the pins have a good reproducible resistance to break, it is therefore possible to easily adjust the overpressure on the shear piston they break (or deform) at and the shear piston begins its movement.

It is particularly preferred that the spacers lie on a circle whose center lies on a central axis of the shear piston, and that the spacers are distributed uniformly around the circle. In this way, the central axis of the shear piston forms an axis of symmetry (in the case of three uniformly distributed pins it is tridentate), so that the shear piston is loaded precisely symmetrically (and not off-center), while the spacers ensure resistance and block movement of the shear piston.

Furthermore, it is advantageous if the side of the spacers facing the printed circuit board is chamfered, specifically in such a way that the region of each spacer adjacent the central axis has a smaller distance from the circuit board than that of the part remote from the central axis. In this way, an inwardly directed force acts when loaded such that the spacers bend inward and thus cannot block movement of the shear piston, which would be possible if they got into the gap between the shear piston and the housing.

According to a further preferred feature, it is provided that the resistance to break of all spacers together is less than 50%, preferably less than 20%, particularly preferably less than 10% of the breaking force of the conductor. This makes it impossible for the conductor to be broken by the spacers, which could result in unforeseeable deformation and correspondingly strong arcs.

Furthermore, it is preferred if the spacer or the spacers are deformable by at least 0.5 mm without breakage. In this way, changes in spacing that occur between the shear piston and the conductor due to thermal expansions can be compensated for.

Such a deformability can be realized in a simple manner by virtue of the fact that for plastic deformation the spacer or parts thereof are formed with a reduced cross-section, in a specific embodiment it is provided that the end of the spacer or spacers facing the conductor is formed is pointed.

This can be realized in a particularly simple manner in the case of spacers that are chamfered as described above, in that the cross-section of the spacers is an isosceles triangle, the apex of which points toward the central axis of the shear piston, and preferably the apex angle of the isosceles triangle is greater than 60°, preferably greater than 70°. In this way, not only is a plastically deformable tip realized, but the pins also preferably bend radially. The apex of an isosceles triangle is understood to mean the corner from which the two equally long legs extend, and the base is the side opposite the apex.

Finally, it is advantageous if the shear piston has at least one recess on the side turned toward the conductor, which recess is of larger volume than the total volume of the spacer or spacer. In this way, the spacers can fit their failure into this recess and thus cannot impair the actual severing process of the shear piston.

If the spacers are at the edge of the recess so that the connection points with the shear piston in the region facing the central axis of the shear piston are farther away from the circuit board than the connection points in the opposite outwardly facing region that the spacers will bend inward (toward the central axis of the shear piston).

Three possibilities are preferred for the material of the spacers. In the most cost-effective variant, it is provided that the at least one spacer consists of the same material as the shear piston, preferably in one piece therewith. In this way, the shear piston together with the spacer or spacers can be produced simply by injection molding.

However, it is also possible for the at least one spacer to consist of a material with greater stretch-to-break than the shear piston. In this case, the spacers are softer, i.e. are slightly deformed, while the shear piston is comparatively rigid.

On the other hand, however, it is also possible for the at least one spacer to consist of a material with a smaller stretch-to-break than the shear piston. In this case, the spacers break relatively easily; they consist of a brittle material. In the two last variants, the shear piston together with the spacer can be produced by a 2K injection molding method.

BRIEF DESCRIPTION OF THE DRAWINGS

The present invention will be described in more detail with reference to the accompanying drawings in which.

WAY(S) OF CARRYING OUT THE INVENTION

Figure 1:
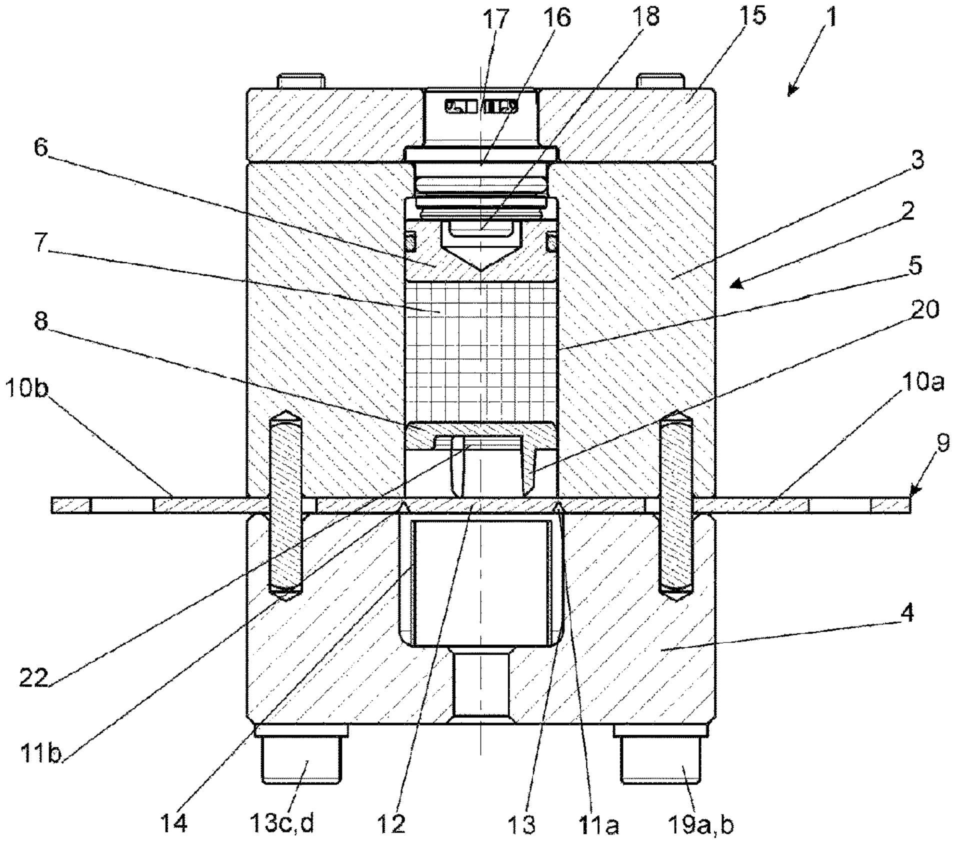
FIG. 1 shows a circuit interrupter according to the invention in section in the starting position.

FIG. 1 shows a circuit interrupter 1 according to the invention having a housing 2 consisting of an upper part 3 and a lower part 4. A pressure piston 6, an extinguishing agent 7 and a shear piston 8 are stacked in a bore 5 of the upper housing part 3. The conductor 9 is positioned between the upper housing part 3 and the lower housing part 4 and has ends 10*a* and 10*b* and separation points 11*a* and 11*b*. The region between the two separation points 11*a*, 11*b* is referred to as a printed circuit board 12. A bore 13 holding a brake element 14 can be provided below the circuit board 12 in the lower housing part 4.

A cover plate 15 fixes an explosive charge 16 with an electrical contact 17 and an igniter 18 and is connected to the lower housing part 4 by screws 19*a*-19*d*.

Thus the structure corresponds to the structure described in above-mentioned AT 517872. The circuit interrupter therefore functions analogously, so that reference is made in this regard to this document.

In addition to these known features, the shear piston 8 has three deformable spacers 20 that hold the shear piston 8 spaced from the circuit board 12. Surprisingly, this arrangement brings about a substantially more uniform separation result over the temperature band.

Figure 2:
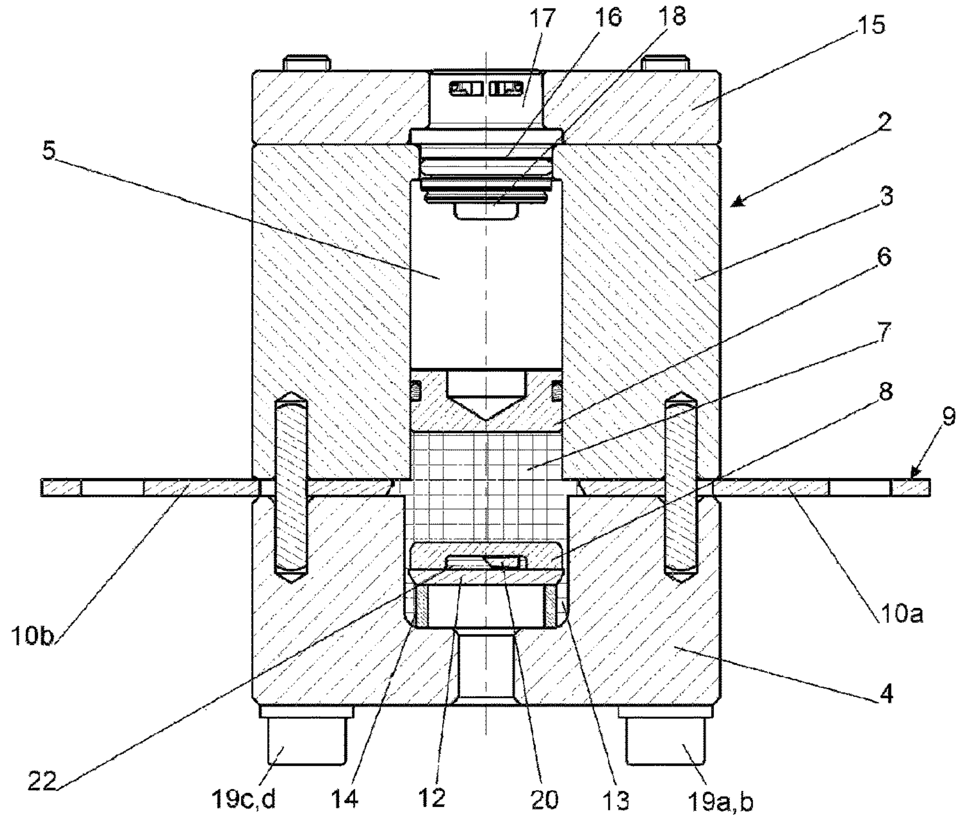
FIG. 2 shows same after triggering.

Upon triggering of the igniter 18 by applying an ignition current to the electrical contact 17, particles and hot gases emerge from the igniter 18 and exert a force on the pressure piston 6 and the pressure piston 6 so that the extinguishing agent 7 and the shear piston 8 press against the printed circuit board 12. The spacers 20 are first elastically deformed and then also plastically deformed until they lie in a recess 22 of the shear piston 8 (see FIG. 2). As a result, the shear piston 8 then comes into direct contact with the circuit board 12 and exerts so much force on the circuit board 12 that it is pressed out of the conductor 9. In this process, the brake element 14 is also deformed. This state is shown in FIG. 2. The deformation of the brake element 14 is shown only schematically by shortening.

If current flows through the conductor 9 during the separation of the circuit board 12 from the conductor 9, arcs are formed at the separation points 11*a*, 11*b* between the conductor ends 10*a*, 10*b* and the printed circuit board 12. These arcs are extinguished by the agent 7 later in the severing process.

Figure 3:
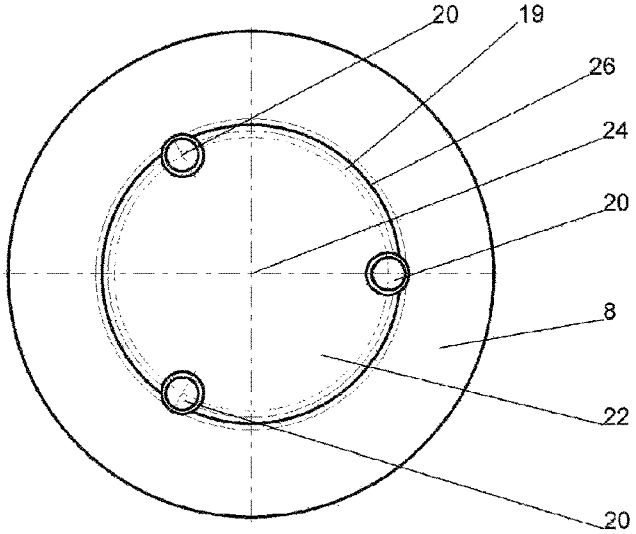
FIG. 3 is a bottom view of a shear piston of this circuit interrupter.
Figure 4:
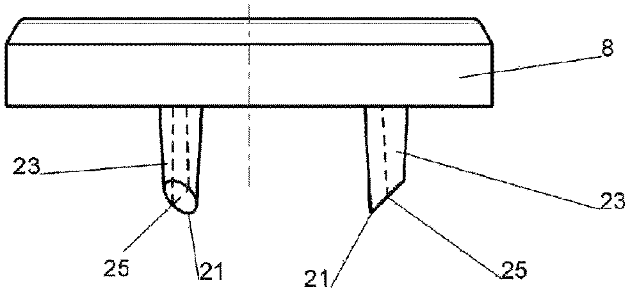
FIG. 4 is a side view of same.

FIGS. 3 and 4 show the shear piston 8 in greater detail. It can be seen that the spacers 20 are spaced uniformly distributed on a circle 19 whose center lies on a central axis 24 of the shear piston 8. Since the center of the circuit board 12 lies substantially on the center line of the shear piston 8, a symmetrical force distribution is achieved both on the shear piston 8 and on the circuit board 12.

If the shear piston 8 has only one spacer 20, it is ideally placed on the central axis 24 of the shear piston 8. In the case of two or more spacers 20, they are preferably uniformly distributed symmetrically to the central axis 24 of the shear piston 8, particularly preferably on the circumference of a circle 19.

It is particularly advantageous if the recess 22 is provided in which the spacers 20 can be accommodated after triggering of the igniter 18, so that the shear piston 8 is not obstructed by the spacers 20 during the severing operation. Therefore, the shear piston 8 has one or more recesses 22 that are large enough to accommodate the bent or bent portions 22 and to receive broken spacers 20. The spacers 20 can also be surrounded by the recess 22.

The deformation direction under load can be controlled via a bevel 25 of the free ends of the spacers 20 (i.e. the ends facing the circuit board 12), in order to direct the spacers 20 into the recess 22 in the center of the shear piston 8 when pressed against the circuit board 12 as indicated in FIG. 2. The outermost regions 21 of the spacers 20, which has the shape of a bent edge and has the smallest spacing from the conductor 9, is thus closer to the central axis 24 of the shear piston 8 than the region 23, where the spacing to the conductor 9 is greater.

The spacers 20 thus have a tip (or angled end) closer to the piston center than the center of the spacer 20. In this way, in the case of axial loading of the spacers 20, a radial inward force component is produced so that the spacers 20 bend inward and move into the recess 22.

This effect is further promoted by the spacers 20 being arranged in the region of an outer edge 26 of the recess 22. This edge is in the form of a (not necessarily rectangular) step. As a result, the connection point of the region 23 with the shear piston 8 is closer to the circuit board 12 than the region opposite the latter, and the spacers 20 preferably bend inward toward the central axis 24 of the shear piston 8.

The bevel 25 provides a further advantage, namely a strong cross-sectional reduction in the region 21. As a result, the spacer 20 is easily deformed in this region 21, so that small changes in spacing due to thermal expansion between the spacers 20 and the circuit board 12 can be compensated without large forces occurring, i.e. the spacers 20 are always in contact with the printed circuit board 12 with slight prestress. Manufacturing tolerances can thus be compensated for. In this region 21, even lower mechanical loads enable elastic or also plastic deformation, For this reason, movement of the shear piston 8 as a result of thermal expansion of the extinguishing agent 7 can be absorbed without destroying the spacers 20. For this purpose, a value of at least 0.5 mm has proven to be expedient for this deformation.

Figure 5:
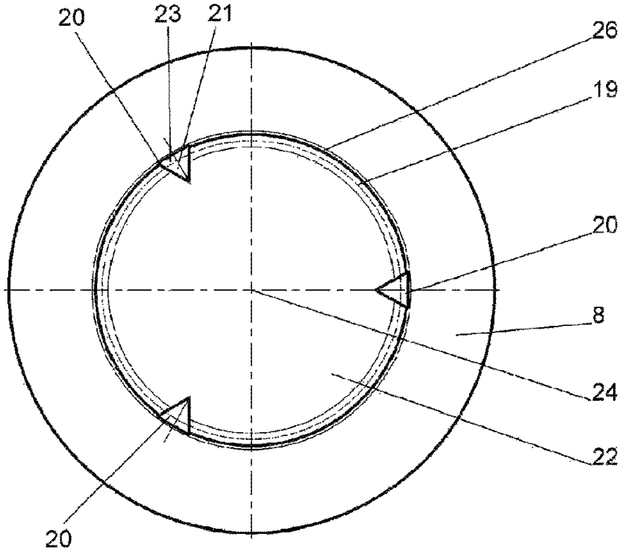
FIG. 5 is a bottom view of another embodiment of the shear piston.
Figure 6:
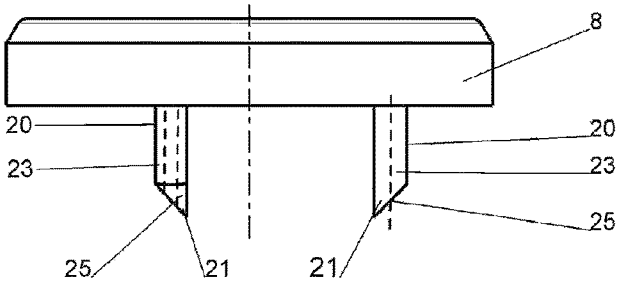
FIG. 6 is a side view of same.

This effect (namely the cross-sectional reduction) can be increased even if the cross section in the inner half (i.e. facing the shear piston central axis 24) is smaller than in the outer half. An example of this is a cross section in the form of an isosceles triangle, where the corner from which the equally long sides extend faces the central axis 24 of the shear piston 8; see FIGS. 5 and 6. As a result of the bevel 25, a bent edge is not produced here, but rather an actual point that can be deformed even more easily.

The resistance to break of the spacers 20 should be at most 50% of the separation force of the circuit board 12 from the conductor 9, preferably at most 20%, particularly preferably at most 10%.

In the simplest embodiment, the spacer or spacers are formed unitarily in one piece with the shear piston.

In special cases, it may be expedient to make the spacers from a material with greater stretch-to-break than the material of the cutting punch in order to increase the plastic deformability, or of a material with lower stretch-to-break in order to promote breaking of the spacers. In both cases, the cutting punch with spacers (s) can be produced simply in a 2K injection-molding process.

Spacers can be used advantageously both in systems with extinguishing agent and in systems without it, independently of the number of separation points (one or two).

The invention claimed is:

1. A pyrotechnic circuit interrupter for severing a conductor, the circuit interrupter comprising
- a housing through which the conductor passes;
- a piston in the housing;
- a charge in the housing rearward of the piston and that is explosively triggerable for driving the piston forward; and
- a spacer that is frangible braced between the piston and the conductor and of a resistance to break such that on explosion of the charge pressure builds up to a predetermined low level rearward of the piston and breaks or bends the spacer to release the piston and allow the piston to move forward toward the conductor.

2. The circuit interrupter according to claim 1, wherein the spacer is at least one pin.

3. The circuit interrupter according to claim 2, wherein a side of the spacer facing a printed circuit board of the conductor is chamfered such that a region of the spacer adjacent a central axis of the piston has a smaller spacing from the circuit board than a region turned away from the central axis.

4. The circuit interrupter according to claim 3, wherein a cross-section of the pin is an isosceles triangle whose apex points toward a central axis of the piston.

5. The circuit interrupter according to claim 4, wherein an apex angle of the isosceles triangle is greater than 60°.

6. The circuit interrupter according to claim 2, wherein a resistance to break of all the pins together is less than 50% of a resistance to break of the conductor.

7. The circuit interrupter according to claim 2, wherein the pin can be deformed by at least 0.5 mm without breakage.

8. The circuit interrupter according to claim 7, wherein regions with a reduced cross-section are provided for plastic deformation on the pin.

9. The circuit interrupter according to claim 8, wherein the pin has a pointed end directed toward the conductor.

10. The circuit interrupter according to claim 1, wherein the spacer is an array of pins lying on a circle whose center lies on a central axis of the piston.

11. The circuit interrupter according to claim 10, wherein the pins are distributed uniformly around the circle.

12. The circuit interrupter according to claim 1, wherein the piston has at least one recess on a side facing the conductor and having a volume greater than a total volume of the spacer.

13. The circuit interrupter according to claim 12, wherein the spacer is attached to an edge of the recess so that connection points with the piston in a region adjacent the central axis of the piston are farther away from the printed circuit board than connection points in a region of the central axis of the piston remote from the region adjacent the central axis of the piston.

14. The circuit interrupter according to claim 1, wherein the spacer consists of a same material as a material of the piston and is integral therewith.

15. The circuit interrupter according to claim 1, wherein the spacer consists of a material with greater stretch-to-break than the piston.

16. The circuit interrupter according to claim 1, wherein the spacer consists of a material with a smaller stretch-to-break than the piston.

17. A circuit interrupter for severing a conductor, the interrupter comprising:
- a housing formed with a chamber through which the conductor passes;
- a piston shiftable forward in the chamber from a rear position spaced in a direction from the conductor and a front position extending through the conductor, whereby such forward movement of the piston through the conductor severs the conductor;
- a charge in the chamber rearward of the piston and that is explosively triggerable to build up pressure behind the piston in the chamber to a predetermined high level; and
- a spacer braced between the conductor and the piston and of a lower resistance to break than the conductor such that on triggering and explosion of the charge pressure builds up behind the piston first to a low level at which the spacer breaks and releases the piston to move forward at a high starting speed.

* * * * *